US005591412A

United States Patent [19]

Jones et al.

[11] Patent Number: 5,591,412

[45] Date of Patent: Jan. 7, 1997

[54] ELECTROSTATIC GUN FOR INJECTION OF AN ELECTROSTATICALLY CHARGED SORBENT INTO A POLLUTED GAS STREAM

[75] Inventors: James T. Jones, Holladay, Utah; Larry M. Kersey, Scottsdale, Ariz.; Richard A. Steinke, Park City, Utah

[73] Assignee: Alanco Environmental Resources Corp., Scottsdale, Ariz.

[ * ] Notice: The term of this patent shall not extend beyond the expiration date of Pat. No. 5,312,598.

[21] Appl. No.: 429,082

[22] Filed: Apr. 26, 1995

[51] Int. Cl.[6] .......... B01D 50/00; B01J 19/08

[52] U.S. Cl. .......... 422/171; 422/170; 422/177; 422/186.04; 422/186.1; 422/213; 422/216; 55/317; 95/58; 95/61; 95/62; 96/27; 239/690; 239/690.1

[58] Field of Search .......... 422/170, 171, 422/177, 186.04, 186.1, 213; 55/317, 302; 95/58, 61, 62, 70; 96/27, 43; 239/705, 707, 690, 690.1

[56] References Cited

U.S. PATENT DOCUMENTS

| | | | |
|---|---|---|---|
| 4,023,939 | 5/1977 | Juntgen et al. | 95/110 |
| 4,083,701 | 4/1978 | Noack | 95/110 |
| 4,220,478 | 9/1980 | Schuff | 106/284.04 |
| 4,254,557 | 3/1981 | Mayer et al. | 422/216 |
| 4,290,786 | 9/1981 | Schuff | 96/27 |
| 4,604,112 | 8/1986 | Ciliberti et al. | 55/302 |
| 4,650,647 | 3/1987 | Kito et al. | 422/169 |
| 4,725,290 | 2/1988 | Ohlmeyer et al. | 95/110 |
| 5,044,564 | 9/1991 | Sickles | 239/690.1 |
| 5,167,931 | 12/1992 | Downs | 422/142 |
| 5,308,590 | 5/1994 | Kersey et al. | 422/170 |
| 5,312,598 | 5/1994 | Kersey et al. | 422/170 |
| 5,332,562 | 7/1994 | Kersey et al. | 423/210 |
| 5,344,082 | 9/1994 | Haller et al. | 239/690 |

*Primary Examiner*—Robert J. Warden
*Assistant Examiner*—Hien Tran
*Attorney, Agent, or Firm*—M. Reid Russell

[57] ABSTRACT

An electrostatic gun for electrostatically charging and injecting sorbent particles into a flue gas stream to contact, and electrostatically charge, pollution particles in that flue gas stream. The electrostatic gun is for inclusion as a component of an apparatus for the remediation of pollution particles from a flue gas stream whereafter the clean gas flow is vented to atmosphere. The electrostatic gun receives laminar flow of a selected sorbent material and charges, either positively or negatively, the surface of each sorbent particle in that flow. To provide electrostatic charging to the individual particles, the flow is directed through a straight barrel of a housing of the electrostatic gun to pass alongside a charging wand that is centered axially in the straight barrel. The charging wand is connected to receive a voltage from a high voltage power supply to produce a corona discharge wherethrough the sorbent materials pass to electrostatically charge each sorbent particle. The invention includes a corona enhancement arrangement in the form of a grounding ring or opposing grounding plates arranged in the barrel and spaced apart from the charging wand, that carry a charge that is opposite to the charge on the charging wand enhance the generation of the corona discharge around the charging wand, greatly increasing the sorbent particle charging efficiency to where essentially all the sorbent particles that pass through the gun will receive a surface charge.

17 Claims, 6 Drawing Sheets

ELECTROSTATIC GUN FOR INJECTION OF AN ELECTROSTATICALLY CHARGED SORBENT INTO A POLLUTED GAS STREAM

BACKGROUND OF THE INVENTION

1. Field of the Invention

This invention relates to devices and systems for providing for charged dry sorbent injection into a polluted gas stream for the remediation of pollutants in that gas stream.

2. Purpose of the Invention

The invention provides a device and system for the remediation and elimination of major industrial pollutants from a flue gas stream that can be practiced at lesser cost and greater efficiency than has heretofore been possible. The invention is for utilization in the removal of a majority of the pollutants as are by-products of coal-fired power plants, soil remediation plants, steel plants, chemical plants, smelters and municipal incinerators. Pollution remediation systems known as dry systems have been shown to required a significantly lower capital investment than that required for wet systems. The invention provides such a charged dry sorbent for pollution particulate removal is an improvement over earlier charged dry sorbent system and is less expensive in that it can be installed for a lesser capital investment than was possible with earlier systems.

Prior Art

In a practice of a flue gas remediation processes that involves a utilization of electrostatically charged dry sorbent particles for the remediation of pollutants in a gas stream, three major systems are involved to maximize charged sorbent particle density and to minimize reaction time and sorbent usage. Such systems provide for the management of the sorbent particle flow rate and feed rate, and a generation of a corona discharge and its control, for a specific sorbent compound. Sorbent compounding, includes sorbent selection and determinations of the sorbent flow and feed rate for the type and amount of pollutant(s) in a gas stream. Realizing that the desired chemical reaction is a surface phenomenon, such determination takes into account the chemical reaction rate of the sorbent particles to the pollution particles. Accordingly, the type of sorbent that is selected, its concentration and particle size will greatly effect charging effectiveness and therefore the costs of system operation. The characteristic of the selected sorbent that are to be considered, include its density, hydroscopic properties and the like, to calculate a rate of feed.

Summarizing, the sorbent feed rate is determined by the stoichiometric properties of the pollutants and the selected sorbent, with the sorbent injection and the flow rate of air injected into the sorbent flow selected to minimize the volume of air that enters the flue gas stream while still obtaining a laminar flow of sorbent material.

The invention is in a charging gun for generating a corona discharge wherethrough the sorbent flow will pass prior to their injection into the polluted fluid gas stream. The injection of charged dry sorbent particles into a polluted gas stream creates a large charged surface area in that gas flow or stream so as to induce charging of the particulate matter therein for the remediation of pollutants. While such remediation devices that rely on electrostatic charging have heretofore been available, such earlier systems have not achieved the sorbent charging efficiency of the present invention that is a dramatic improvement over such earlier electrostatic charging devices.

A device of two of the present inventions U.S. Pat. No. 5,312,598, shows and claims an electrostatic charging gun for use in a system to provide for the remediation of pollutants in a gas stream and for the removal of charged pollution particles therefrom that the present invention improves upon. Further, other U.S. Patents of two of the present inventors, U.S. Pat. Nos. 5,308,590 and 5,332,562, show a utilization of an electrostatic charging gun that the present invention also improves upon. Additionally, other examples of electrostatic guns and antenna devices are shown in U.S. Patents to Schuff, U.S. Pat. No. 4,220,478; and U.S. Pat. No. 4,290,786. Neither of which Schuff patents show an electrostatic charging arrangement that is like that of the present invention in either its structure or functioning.

The above cited U.S. Pat. No. 5,312,598, provide an electrostatic charging gun with a proven capability for charging sorbent particles in a particle flow that is directed therethrough. While, in practice, this charging gun, when used in the apparatus of the above cited U.S. Pat. No. 5,308,590 has worked relatively well, it has been found that a high percentage of sorbent particles in the sorbent flow remain uncharged. To compensate, a higher volume of sorbent particles has been required to be used than would be necessary if the percentage of charged particles in that flow were improved. The electrostatic gun of the invention provides such needed improvement in particle charging efficiency and does so at a decrease in electrical power as has formerly been required for particle charging.

SUMMARY OF THE INVENTION

It is a principal object of the present invention to provide an electrostatic gun for use in a system for the remediation of flue gas pollutants that provide for electrostatically charging a flow of sorbent particles that have been selected for the particular flue gas pollutants, and for passing sorbent materials, under pressure, through the gun for charging, that the travel into the polluted flue gas flow or stream to create an area of charged sorbent particles therein for charging, by contact, the pollution particles in that flue gas flow.

Another object of the present invention is to provide an electrostatic gun that provides for charging sorbent particles by a generating a corona discharge in the gun barrel that will extend from around and at a distance outwardly from a charging wand that is centered longitudinally in the gun barrel wherethrough a flow of sorbent particles is passed, and including a grounding ring or grounding plates spaced from the charging wand that are electrically attractive to a charge on that wand to promote formation of the corona discharge.

Another object of the present invention is to provide an electrostatic gun for uniformly and essentially fully electrostatically charging the surface of each particle in a flow of sorbent material particles that pass through the corona discharge, and providing for adjusting the corona discharge by varying the power thereto.

Another object of the present invention is to provide an electrostatic gun that can be sized for handling and electrostatically charging a flow of sorbent materials whose selection takes into account the sorbent particle size, its surface area, density and hydroscopic properties, to provide for selection of an optimum sorbent feed rate for the pollutants as are determined to be in a flue gas flow to whereby a dispersal of the charged sorbent particles is achieved so as to essentially charge all the pollutant particles in that polluted gas stream.

Still another object of the present invention is to provide an electrostatic gun that is suitable for operation with one or more like electrostatic guns to electrostatically charge a volume of sorbent materials as are required to fully charge a volume of pollutants as are present in a flue gas stream.

Still another object of the present invention is to provide an electrostatic gun that can be set to operate on a minimum power while still providing for charging essentially all the particles in a flow of a sorbent material as are required to charge essentially all the pollutant particles in a flue gas stream, which electrostatic gun is safe and reliable to use and is relatively inexpensive to maintain and operate.

These and other objectives of the present invention will become apparent to those knowledgeable and skilled in the art from the description set out below.

Briefly, the electrostatic gun of the present invention provides for electrostatically charging and injecting a flow of sorbent materials into a flue gas flow or stream to react with the pollution particles that are in that flow or stream for the remediation of the gas pollutants. The selection of a sorbent compound for use in a particular remediation process takes into account the characteristics of the sorbent particles to include their surface area, density, hydroscopic and stoichiometric properties as well as the stoichiometric properties of the pollutants as are actually found in a particular flue gas flow or stream, with stoichoeimetric defined in Random House Dictionary as "the calculations of quantifies of chemicals elements or compounds involved in chemical reactions". In a practice of such remediation process, the electrostatic gun receives a volume flow of the sorbent material that is selected for the type and amount of pollutants(s) as are present in the flue gas stream. The selected volume of sorbent material is passed from a sorbent storage vessel or system and receives a measured flow of air mixed therein for passage to the electrostatic gun as a laminar flow. The flow of sorbent particles is electrostatically charged by the electrostatic gun such that essentially all the sorbent particles in that flow will be charged that are then injected into the polluted flue gas flow or stream.

The charged sorbent particles as are injected into the flue gas flow create a charged area that the gas flow individual pollution particles will be attracted to and will come in contact with the charged sorbent particles so as to themselves become charged from that contact. In which charging, the charged sorbent and pollution particles tend to agglomerize, and will attract or are attracted to gaseous particles that also agglomerize therewith. The agglomerized particles are then of a size to be conveniently removed utilizing a conventional bag house, electronic precipitator, moving bed system, or the like, with that clean gas flow then vented to atmosphere. The electrostatic gun of the invention can be shaped and sized appropriately for the particular polluted gas flow directed therethrough, and more than one charging gun can be arranged to provide a flow of charged sorbent particles into the flue gas transfer line, as required.

The electrostatic charging gun of the invention includes a charging or grounding ring or collar, or spaced apart charging or grounding plates, that are arranged in the gun barrel adjacent and equally spaced from a charging wand centered in that barrel. The grounding collar or plates are to provide an electrically attractive surface or surfaces to attract a charge carried on the charging wand. To provide which attraction, the grounding collar or plates carries a different electrical potential from that carried on the charging wand and provides for stimulating the creation of a corona discharge surrounding and extending outwardly from the charging wand. The laminar sorbent particles flow, under pressure, is directed through the corona discharge, such that each sorbent particle will absorb, from the corona, a charge over its entire surface. The diameter of the charging wand and its spacing distance to the charging or grounding ring or collar, or spaced apart charging plates will determine the height of the corona discharge, extending from the charging wand. Accordingly, the combination of the charging wand and oppositely charged grounding collar or plates provides for a generation of a corona around that charging wand that will extend a distance outwardly therefrom to contact and charge the sorbent particle flow at lower electrical power than has been required for earlier like devices that have provided a less extensive corona discharge.

The charging or grounding ring or plates are preferably electrically connected to a separate power source from the charging wand, such as a battery, to carry an opposite charge to that carried on the charging wand. The charge on the charging wand is thereby attracted to that on the grounding collar or plates, promoting the formation of the corona discharge around that wand that will extend outwardly toward which grounding collar or plates.

In practice, as set out above, the charging or grounding ring or collar, or pair or more of electrically conductive plates are positioned alongside and spaced apart from the charging wand. To maximize the efficiency of a corona formation around the wand, without creating arcing, a ratio of the grounding ring to the charging wand diameter should be greater than 2.72 and is preferable approximately 3.77. So arranged, a voltage of up to 100,000 volts at up to 0.05 milli-amps can be passed to the charging wand to produce the corona discharge, without arcing, that will extend outwardly from around the wand surface towards the charging or grounding collar or plates. A corona discharge is thereby provided wherethrough essentially all the sorbent particles will pass. The flow of sorbent particles that is passed, under pressure, as a laminar flow along the charging wand, through the corona discharge to essentially fully charge the surface of each sorbent particle, for dispersion throughout the polluted flue gas flow or stream. The charged sorbent particles provide a charged area in the gas stream that the pollution particles will pass through. In which passage the pollution particle are themselves charged to the same charge as that of the sorbent particles.

The charging wand of the invention, to limit electrical losses, is preferably insulated along its surface from a rear coupling end to a location that is opposite to the grounding ring. Also the wand surface is preferably roughened to provide a greater surface area so as to facilitate formulation of a corona discharge generation. Also, the wand surface opposite to grounding ring, may additionally be shaped to facilitate production of a desire corona discharge. The corona, in practice, is preferably generated at or near the interface of the charging gun discharge end with the flue gas stream to minimize sorbent particle discharge losses. Additionally, the grounding ring power source, that may be a battery, is preferably arranged to provide an adjustable output voltage. In operation, when the charged sorbent and pollution particle contact one another, along with the pollution particle taking on the sorbent particle charge, the particles tend to agglomerize and promote reactions with and bond to submicron size particles in the flue gas flow. The charged, agglomerized and reacted particles can then be removed as in bag house, electrostatic precipitator, moving bed arrangement, or the like, thereby cleaning the gas flow or stream that can then be vented to atmosphere.

Spacing distance of the charging wand from the respective grounding ring or plates of the invention is critical to proper corona discharge formation and, accordingly, it is important to maintain the changing wand exactly centered in the straight barrel. To maintain charging wand positioning a rear end thereof is fitted to and receives power from an insulator covered conductive rod that is itself centered in the gun barrel, and the charging wand forward end may be fitted into a center cup or cylinder of a spider mount. Which spider mount includes straight supports extending radially, at spaced intervals, from around the center cup or sleeve, and connect to a ring that is maintained onto the straight barrel interior wall. The spider mount extends across the straight barrel and is preferably formed from an electrically non-conductive material such as a ceramic.

The size of the barrel of the electrostatic gun of the invention is selected for the particular sorbent and air mix flow as it is to receive and is arranged for mounting the charging wand longitudinally centered therein. Which charging wand is connected, on a rear end thereof, to a source of electrical energy that is preferably arranged to be variable to allow for the particular volume of sorbent flow. The sorbent particles of the sorbent flow are preferably fine grain particles and, after passage through the electrostatic gun or guns, will all have the same charge and will thereby repel one another to be rapidly disperse in the gas stream. This provides a large charged surface area in the polluted gas stream for inducing, by contact with the pollution particulates, like charging of the pollution particle and agglomeration with the particulate matter that are entrained within the flue gas stream. The flue gas stream particulate matter consist of submicron and larger particles agglomerized with the sorbent particles to carry the same charge and pass through a transition Whereafter the charged and agglomerized particles are passed, for removal, into a standard bag house, an electrostatic precipitator, or a filter bed arrangement, that remove the charged particles and agglomerized particles, cleaning the gas flow or stream that can then be vented to atmosphere.

DESCRIPTION OF THE DRAWINGS

In the drawings that illustrate that which is presently regarded as a best mode for carrying out the invention.

DETAILED DESCRIPTION

Figure 1:
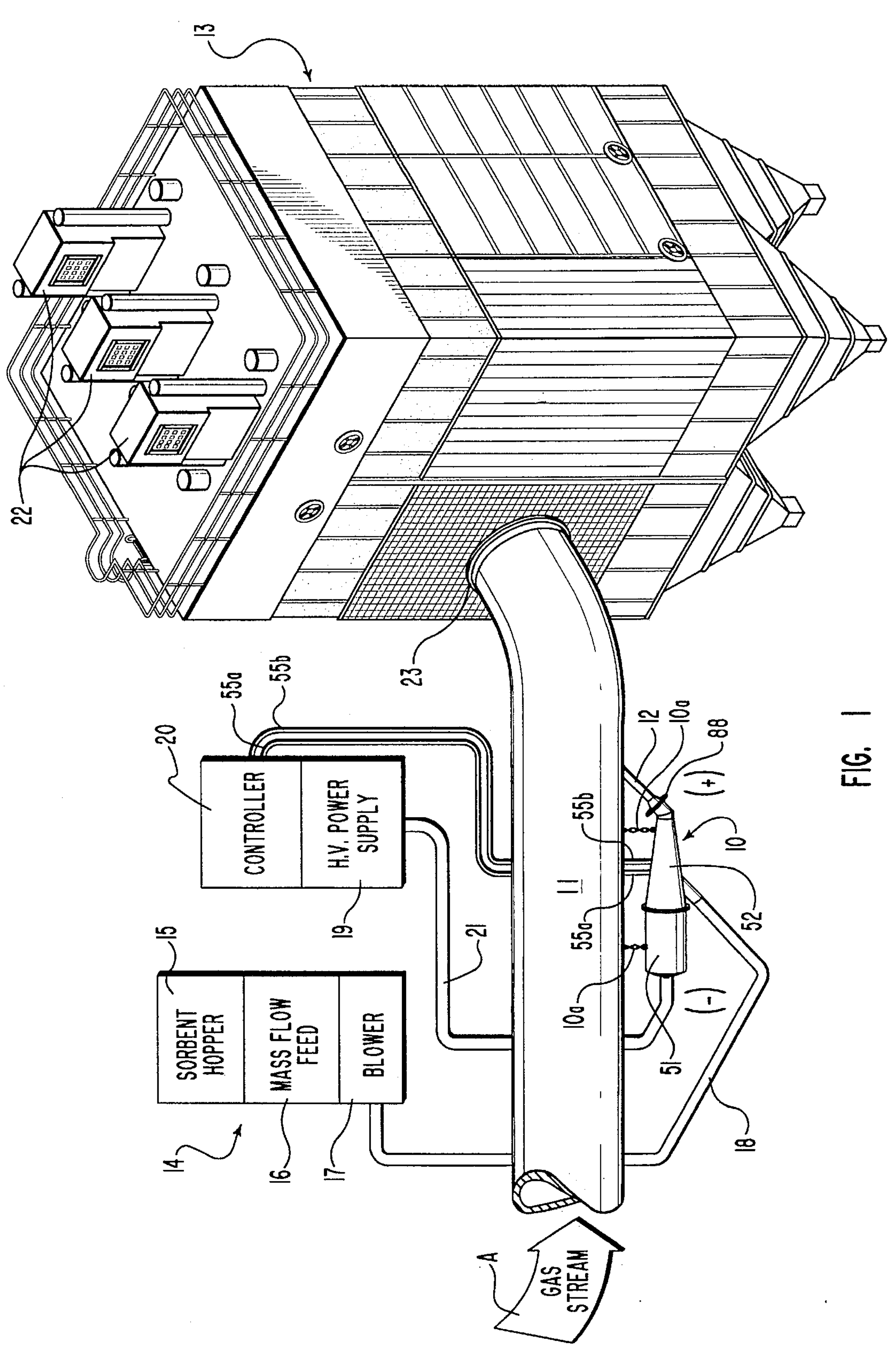
FIG. 1 is a profile perspective view of a schematic of the invention in an electrostatic gun arranged for receiving and charging a measured laminar flow of sorbent particles and for discharging the charged sorbent particles into a polluted gas stream that is shown connected to an electrostatic precipitator having three sections.

FIG. 1 shows a profile perspective view of a schematic representation of the present invention in an electrostatic gun or dry sorbent injection gun 10 of the invention, hereinafter referred to as gun. Shown also in FIG. 1 is a system for removing particulate matter and gaseous pollutants from a flue gas stream, identified as arrow A, that is shown flowing into a tube 11. The gun 10 is shown to include a sorbent discharge line 12 that connects into the tube 11 to pass a measured laminar flow of charged sorbent particles, under pressure, for mixing in the flue gas stream. The flow of air and sorbent materials pass through and are charged in the gun 10 for dispersion into the polluted gas stream. In that passage, the sorbent particles will receive, over their surfaces, a like charge, repelling one another and are thereby rapidly dispersed in the flue gas stream. A large electrostatically charged area is provided that attracts and interacts with the pollution particles in the flue gas stream to both charge the individual pollution particles and to agglomerize with them. The charged and agglomerized particles then travel to a particulate removal apparatus like, for example, the pollution control apparatus set out in U.S. Pat. No. 5,308,590 that is also shown in use in a method patent, U.S. Pat. No. 5,332,562; or can involve an electrostatic precipitator 13, like that shown in FIG. 1; or a bag house 30 arrangement, like that shown in FIG. 2, or the like.

Like the patents as were cited earlier herein, the gun 10 of the present invention is preferably for use in a system for the remediation and elimination of pollutants in a flue gas stream. Such system, as shown in FIG. 1, includes a hopper system 14 that provides a sorbent hopper 15, a mass flow feed 16, and a blower 17. The hopper system 14 provides for passing a measured volume of sorbent materials under a pressure that has been generated by an air flow from blower 17 to provide a laminar flow. The flow is adjusted to contain a maximum volume of sorbent material for a minimum air content of the sorbent material as is selected for the particular flue gas pollutants to be remediated. Which sorbent material selection considers the sorbent particle density and their hydroscopic properties for the chemical pollutants to be removed and takes into account that the chemical reaction rate of the sorbent and pollution particles is a surface phenomena. Which sorbent feed rate is further determined from a consideration of the stoichiometric properties of the pollutants and those of the sorbent compound. The laminar flow of sorbent materials is passed through a line 18 to travel through the gun 10 wherein the individual sorbent material particles are electrostatically charged. The charged sorbent particles are then injected into a polluted flue gas stream, arrow A in FIG. 1, that then travels to the apparatus for the removal of agglomerized sorbent and pollution particles from that gas stream.

To provide for sorbent particle charging and injection into the gas stream A that is traveling through tube 11 a high voltage power supply, shown as block 19, is operated by controller 20, to pass a high voltage through wires 21, shown as a single wire, to the gun 10. The controller 20 may also be used to provide power through wires **55*a* and 55*b* to grounding ring 95, as set out below, that is provided for an enhancement effect to a corona discharge that is formed around a charging wand 70**, as set out in detail hereinbelow.

An apparatus for removing charged sorbent and pollution particles, is shown in FIG. 1 as an electrostatic precipitator 13 that will provide for removal of essentially all pollution particles and gases in a polluted gas stream. The electrostatic precipitator of FIG. 1 is illustrated as including a plurality of transformer-rectifier sections 22 that are maintained on a top of the unit. Which sections 22 are for supplying power to a number of discharge and collection electrodes to generate a strong field between which plates. Contaminated gases are passed through the field between the plates and a unipolar discharge of gas ions from the discharge electrode will then attach itself to the particles to be collected. This unipolar discharge of gas ions, generally at a negative charge, is brought about at certain critical voltages where air molecules become ionized. The gun 10 the invention provides for a charging of sorbent particles by their passage through a corona and for their injection into the gas stream, to form a charged area within the tube 11 to both charge the pollution particles in the gas stream and to agglomerize with them. Accordingly, the charged and combined pollution and sorbent particles that pass into an inlet 23 of the electrostatic precipitator 13 are already charged and only minimum power, if any, is required to further charge them.

Figure 3:
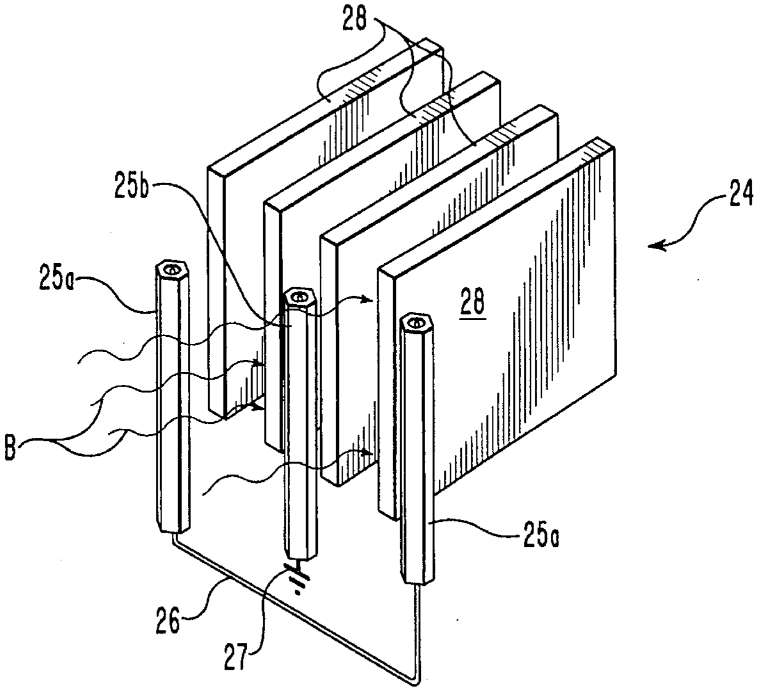
FIG. 3 is a profile perspective schematic view of a cell of a two stage electrostatic precipitator like that shown in FIG. 1.

FIG. 3 shows an example of a two stage precipitator 24 that may be utilized as a component of the electrostatic precipitator 13. Though, it should be understood, other precipitator configurations such as a wire and plate precipitator, or the like, could be used in the electrostatic precipitator 13, within the scope of this disclosure. For the two stage precipitator 24 of FIG. 3, a dirty gas flow, arrow B, passes through spaced apart tubes **25*a* and 25*b*, as a preionizing stage. The outer tubes 25*a* connect through preionizing wires 26 with the center tube 25*b* shown connected to a ground 27. A potential voltage thereby exists between adjacent tubes 25*a* and 25*b* that provide for particle charging. The dirty gas flow, arrow B, then travels between a number of spaced parallel plates collector plates 28 that are maintained at a charge that is opposite to that induced onto the gas particles, providing for both attracting and collecting those particles. Which collector plates 28** are arranged as pairs that can be individually rapidly discharged and charged. One or the other of each of a pair of plates are arranged to be periodically discharged or charged from positive to negative, or vice versa. The change in plate charge to cause the charged gas particles that have been attracted thereto to be repelled, when the plate charge changes and fall off the plate and into a catchment area below, not shown. Which collector plate charging and discharging provides for attracting and releasing the charged gas particles, removing them from the gas stream that can then be vented, as clean gas, to atmosphere.

The above brief description of an electrostatic precipitator and its functioning should be taken as being for example only of a device or system that is suitable for use with the invention for the removal of charged sorbent and pollution particles from a gas stream. Charged particle removal can also be provided by a moving bed system like that shown in the above cited U.S. Pat. Nos. 5,308,590 and 5,332,562 of two of the present inventors. Additional to the moving bed system of the above cited U.S. Patents and the electrostatic precipitator, the charged sorbent and pollution particles can also, for example, be removed utilizing a bag house 30 arrangement like that shown in FIG. 2.

Figure 2:
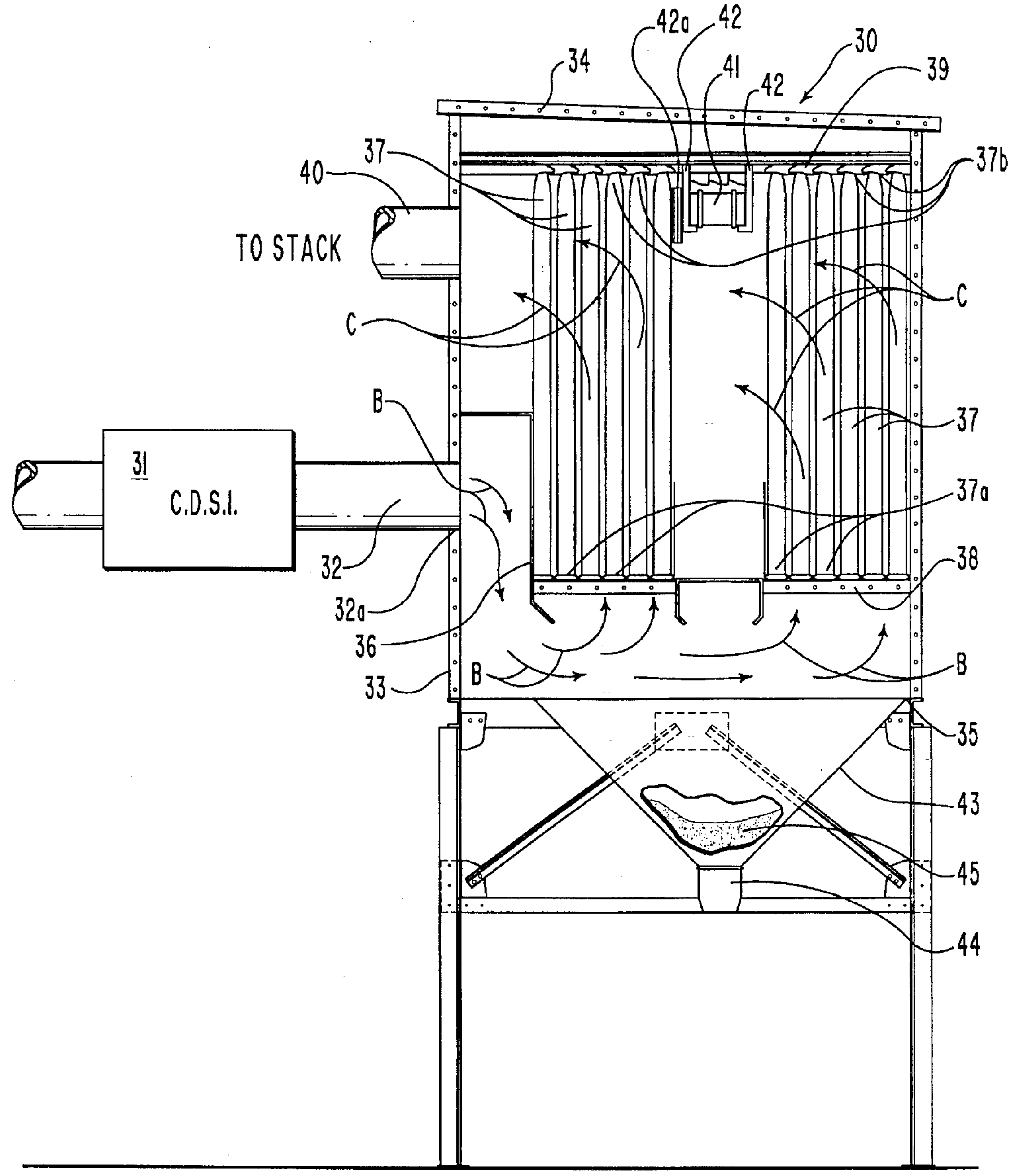
FIG. 2 is a profile sectional view of a bag house arrangement that is shown connected to receive a combined flow of charged sorbent pollution particulates and is for removing agglomerized particles from the flow or stream and venting cleaned gas to atmosphere.

FIG. 2 illustrates bag house 30 connected to receive the combined laminar flow of charged sorbent and flue gas pollution particles from a charged dry sorbent injection gun (CDSI) 31, that is preferably essentially the same as the electrostatic gun 10 and its components of FIG. 1. Shown in FIG. 2, the combined flue gas stream and charge particle flow passes through pipe 32 into the bag house 30. In this arrangement, the charged sorbent and pollution particles have agglomerized to form particles of a size to be conveniently removed during passage of the gas stream through the pours or openings in bags arranged in the bag house.

The bag house 30 includes a body having a rectangular shape formed from side walls 33, that are closed over by a top 34 and is open across a bottom end 35. The charge agglomerized particle contained in the air stream, shown as arrows B in FIG. 2, pass through the a tube end **32*a* that connects through a side wall 33 into the bag house 30. Which bag house 30 preferably contains a number of cells that are like that described below. The air stream that passes into the house body immediately impacts a baffle plate 36 of each cell. In that impact, heavier particles are dislodged from the gas stream and fall through the open area 35 and into a particle catchment basin 43 that is shown as having a funnel shape. Wall or walls of the catchment basin 43 slope inwardly into a neck 44, and a mass of agglomerized particles 45** are shown collected in that neck area to pass therefrom for disposal or processing.

Additional to the particles as are removed from the gas stream B on contact with the baffle plate 36, the particles remaining in the gas stream are removed by passage of the gas stream through bags that are maintained parallel in the bag house between a base plate 38 and top plate 39. The base plate 38 provides for mounting an open neck end **37*a* of each bag 37, to where the gas stream B that has traveled around the baffle plate 36 lower end, passes into each bag open neck end 37*a*. The gas stream B travels up and along each bag 37 to a closed top end 37*b*, venting through pores of the gas bag and depositing the agglomerized particles along the inner surface of each bag. The gas stream is thereby cleaned of its particle content and passes through the bags, as clean gas stream C, and travels into an exhaust line 40** that connects to a stack, not shown, for venting to atmosphere.

A bag shaking system is preferably included with bag house 30 to facilitate removal of the agglomerized particles as are captured on each bag 37 inner surface. As shown, the bag shaking system preferably includes an electric motor 41 that is mounted between brackets 42 that connect to the top plate 39. A motor 41 output shaft, not shown, connects through an eccentric, not shown, that is maintained to a mounting block **42*a*, that, in turn, is rigidly secured to the bag house body. With a turning of the motor 41 drive shaft and eccentric, the motor and brackets 42 are moved, eccentrically to vigorously shake, the top plate 39 and connected closed bag ends 37*b*. The collected particles are thereby shaken off from the bag interior surface and fall out of the bag open lower ends 37***a*. The displaced particles that fall out of bags 37 travel into the catchment basin 43 and mix with the particles that had fallen out of the gas stream B when it contacted baffle plate 36. Thereafter, the particles travel down the catchment basin 43 inwardly sloping walls to nozzle end or neck 44 and collect into pile 45.

The above sets out several different apparatus for removing of charged and agglomerized sorbent and pollution particles from a flue gas stream. It should, however, be understood that other devices and apparatus could be so used with the charged dry sorbent injection gun 10 of the invention, as set out above and discussed in detail hereinbelow. Which gun 10, it should be understood, is the subject of this invention.

Figures 4, 7A:
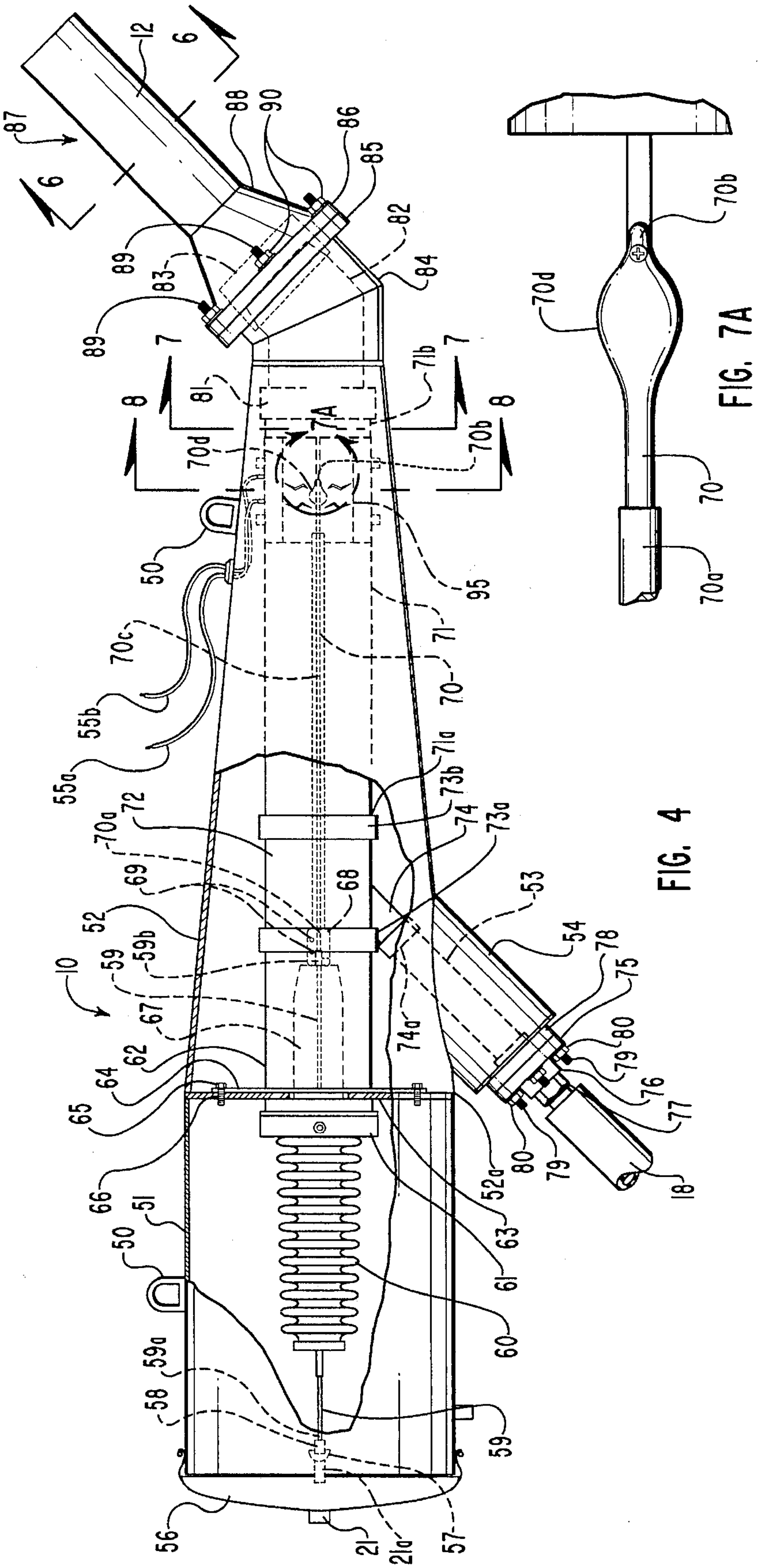
FIG. 4 is an enlarged side elevation view of the electrostatic gun of FIG. 1, with a section removed from a rear portion of a housing thereof exposing an insulator that is coupled to a high voltage source and showing a barrel rear section with a forward portion and with a charging wand and grounding collar fitted in the barrel, that are shown in broken lines.
FIG. 7A is an enlarged sectional view taken within the line 7A—7A of FIG. 4, showing a portion of the charging wand opposite to the grounding ring inner surface as having been enlarged adjacent to the charging wand end that is connected into the spider mount.

FIG. 1 shows the gun 10 supported to the tube 11 by chains 10*a* that are each connected, at a top, link through an eyelet 50, as shown best in FIG. 4. The eyelets 50 are secured to extend outwardly at approximately right angles from spaced points along a top edge of rear and forward gun housings 51 and 52, respectively. Shown best in FIG. 1, the rear gun housing 51 receives a power cable 21 through an end cap 56 of rear housing 51, shown in FIG. 4, that extends from the H. V. power supply 19 whose electrical output is controlled by controller 20. The forward housing 52 connects to line 18 through a sorbet inlet tube 53, shown in broken lines in FIG. 4, that is maintained axially in a tube housing 54. The hopper system feeds a measured flow of dry sorbent material, under pressure to provide a laminar flow of sorbent particles into the gun 10. It should be understood, that the respective hopper system, H. V. power supply and controller are preferably like the respective sorbent feed and power supply arrangements that were set out in the earlier patent of two of the inventors U.S. Pat. No. 5,312,598. Accordingly, hopper system 14 and H. V. power supply 19 and controller 20 will not be further discussed herein, it being understood, that the preferred apparatus and its functioning, have been fully described in which earlier patent, and is here included by this reference. The discussion of which earlier hopper system, it should be understood, sets out a preferred arrangement for providing a flow rate of sorbent materials that is determined for a particular type and content of pollution or pollutants in a flue gas stream, and takes into account that the reaction rate of the sorbent and pollution particles is a surface phenomena. The choosing of a particular sorbent material is made based upon the type of positive ion exhibited by the sorbent material and its concentration and the particle size and surface areas thereof as well as the sorbent density and hydroscopic properties and further takes into account the storcheometric properties of both the sorbent material and pollutant or pollutants to be removed from the flue gas stream. More than one gun 10 can be utilized to charge sorbent flows, and the high voltage power supplied to each gun 10 can be adjustable so as fully charge all the particles in that sorbent material flow. Which sorbent material flow is pressurized, preferably by a blower whose air flow output can be varied, to provide for flow rate that is adjustable over a wide range of flow rates to provide air under pressure to produce a laminar flow of air and sorbent materials for injection into the gun 10 for charging and injection into and dispersed within the polluted gas stream. Which particulate charging, it should however be understood, due to the gun 10 improvements discussed hereinbelow, will require less electrical power and is more efficient than earlier charging gun arrangements and provides for essentially charging of all sorbent particles as pass through the gun 10. Accordingly, the gun 10 of the invention, it should be understood, is suitable for use for removing pollution particulates from a number of different polluted flue gas streams.

Shown in FIG. 4, the gun 10 includes the rear and forward housings 51 and 52 each of which may include an eyelet 50 secured thereto, for connection to ends of mounting chains 10*a* whose other ends connect to the tube 11 mounting the gun 10 thereto, shown in FIG. 1, or other mounting arrangement can be employed within the scope of this disclosure. As shown in FIG. 1 and in FIG. 4, additional to the cable 21 that connects the H. V. power supply 19 to into the rear housing 51, an additional pair of wires 55*a* and 55*b*, connect the controller 20 to an a grounding collar or ring or a grounding plate system to provide power thereto that has a different charge than the power passed through cable 21, or a battery may be utilized to provide this function, as set out in detail below.

Like the above described earlier patented system of the inventors, the gun 10, receives a measured laminar flow of dry sorbent materials from hopper system 14, to react with the particular pollutants as are contained in the polluted flue gas flow or stream illustrated as arrow A in FIG. 1. For many applications fine particulate lime are selected that are suitable for the removal of pollutants from a flue gas stream emitted by coke ovens, stinter plants or steel-making furnaces. Whereas, for coal-fired boilers, a selected sorbent material may be nacholite that will react with sulfur dioxide in the gas stream to form sodium sulfate that adheres to the sorbent particles. Preferably, the selected dry sorbent materials are reduced to fine particles before loading into the hopper system 14 for passage to the gun 10.

The capacity of the sorbent hopper 15 of the hopper system 14 is selected to provide a dry sorbent material laminar flow into the gun 10, as required. The flow rate is selected to provide sufficient charged sorbent particles that are dispersed into the polluted gas stream to fully charge and attract all the pollution particulates in that flue gas stream. In practice, a sorbent hopper 15 capacity of one (1) to several thousand cubic feet is appropriate for the invention. Dry sorbent materials are preferably gravity fed from sorbent hopper 15 into the mass flow fed 16 that measures a volume of dry sorbent materials and moves it through a discharge nozzle, not shown, for transfer through line 18 by operation of blower 17. In practice, a regenerative blower that is capable of providing a variable and closely controlled output volume of pressurized air is suitable for use as blower 17. Such regenerative blowers are in common use.

The volume of sorbent particle directed into gun 10 can be provided by either a volumetric feed system or a loss-in-weight system. Where a very accurate volume of the dry sorbent materials is required, the more accurate loss-in-weight system is preferred. Some such feeder system are currently manufactured as for example, by AccuRate, Inc., by Vibra Screw, Inc., by KTron, Inc., by AutoWeight, Inc., and others. The selection of a particular feed system for use with gun 10 is dependant upon its capabilities for meeting the need to provide a required flow of dry sorbent materials for the particular makeup of the flue gas stream. Air under pressure and sorbent materials mixing preferably takes place in a venturi throat located upstream from line 18, not shown, wherein is provided a velocity increase for thoroughly mixing the dry sorbent materials and air, into a pressurized laminar flow. In practice, a flow of dry sorbent materials entrained in air is maintained at a pressure of from one (1) to ten (10) PSI during passage through line 18 and into the sorbent injection tube or sorbent inlet tube 53, as shown in FIG. 4.

Gun 10, as shown in FIG. 4, includes, as its rear end, the rear housing 51, that is shown as a cylinder having an open interior. It should, however, be understood, rear housing 51 may be square or rectangular or other shape within the scope of this disclosure. The end cap 56 is arranged for fitting across an open rear end of rear housing 51, wherethrough the cable 21 is fitted. A cable 21 end 21*a*, shown in broken lines, connects to a fitting 57, that is also shown in broken lines. The fitting 57, in turn, is fitted through a rod coupling end 58 that is secured to a rear end 59*a* of a power transfer rod 59. The power transfer rod 59, in turn, is fitted axially through an insulator 60 that connects to a mounting collar 61 on a forward end.

The insulator mounting collar 61 is a rear end of a barrel insulator section 62 that is fitted through a hole formed through approximately the center of a forward plate 63 and is secured to a forward end of the rear cylindrical housing 51. The barrel insulator section 62 includes a right angle flange 64 secured therearound. The right angle flange 64 is fitted and secured onto a forward face of the forward plate 63 with fasteners 65 fitted therethrough that are turned through threaded holes 66 formed through the forward plate 63. So arranged, the barrel insulator section 62 is maintained to the insulator 60 forward end and, connects to the forward plate 63. A rear end edge 52*a* of the forward housing is secured to the forward plate 63 edge, as by a ring clamp arrangement, or the like, not shown, thereby aligning and connecting the respective edges into the gun 10 housing.

A ceramic base 67, shown in broken lines in FIG. 4, is maintained axially within the barrel insulator section 62 and includes a forward end section of the power transfer rod 59 that extends therethrough and ends in a power transfer rod end 59*b*. The power transfer rod end 59*b* is fitted into a rear end of a wand coupling 68, shown in broken lines. The wand coupling 68 is preferably formed from flat opposing sections that are coupled together as by fitting fasteners 69 through each, clamping the components together over both the power transfer rod end 59*b* and a rear end 70*a* of a charging wand 70. So arranged the changing wand end 70*a* is electrically connected to the power transfer rod end 59*b*, passing voltage from the high voltage power supply 19 thereto.

The charging wand 70 is preferably contained within an insulative sleeve 70*c* from a rear end 71*a* to a forward section and is maintained axially in a barrel 71, of gun 10, that is shown in broken lines as a straight cylinder, that is open therethrough. A rear end 71*a* of barrel 71 is maintained in a sleeve 72 that includes rear and forward coupling collars 73*a* and 73*b*. The coupling collars are for fitting, respectively, to a forward end of the insulator section 62 and rear end 71*a* of the barrel 71. The sleeve 72 further includes a sorbent flow tube 74 that is fitted at an angle less that ninety (90) degrees, into the sleeve side and includes a collar 74*a*. The collar 74*a* is for coupling to a forward end of the sorbent injection tube 53 that is contained within tube housing 54. Which tube housing 54 is secured into the side of the forward housing and to a coupling plate 75 that has a threaded center fitting 76 extending at a right angle out from the center thereof that is for connecting to a sorbent inlet fitting 77. The coupling plate 75 fits across a forward face of a tube housing plate 78 that is arranged across a lower end of tube housing 54. The coupling plate 75 and tube housing plate 78 are fitted and maintained together by passing bolts 79 through aligned holes formed through the plates and turning nuts 80 thereover. So arranged, the line 18, wherethrough is passed the measured flow laminar of sorbent materials under pressure, is connected to pass the flow of sorbent particles into the barrel 71 to travel therein alongside the insulative sleeve 70*c* to the exposed charging wand 70 forward end.

The barrel 71 is preferably smooth walled therealong to where a grounding ring 95 is arranged in a forward barrel 71 end, as discussed hereinbelow. The laminar flow of the mix of air and sorbent particles flows alongside the insulated charging wand 70, shown in broken lines, extending longitudinally in the barrel center, that, as required, may not be insulated, to the uninsulated forward section of the wand that is immediately opposite to the grounding ring 95. Such insulative covering sleeve 70*c* is preferred for minimizing electrical losses.

The barrel 71 forward end 71*b* is shown maintained to a coupling fitting 81, shown in broken lines, that connects to an angled barrel forward end 82 that mounts to a barrel discharge 83. It should, however, be understood that another discharge arrangement could be so used within the scope of this disclosure, and that the barrel discharge may connect directly into the tube 11 to essentially discharge the charged sorbent particles directly into the flue gas flow or the like. Accordingly, where a connecting line arrangement is shown as an angled forward housing section 84, that contains the angled barrel forward end 82, and terminates in a flange 85 whose forward face is fitted to a rear face of a flange 86 that is a rear end of a bell shaped end 88 of a sorbent feed nozzle 87, such arrangement may be dispensed with, and a different coupling arrangement utilized within the scope of this disclosure.

The bell end 88, as shown, includes a cone shaped wall that slopes into, to form, the sorbent discharge line 12, as shown also in FIG. 1. Shown in FIG. 4, to maintain the flanges 85 and 86 fitted together, spaced aligned holes are formed through the flanges to receive bolts 89 fitted therethrough that receive nuts 90 turned thereon, coupling the flanges together.

Set out above the smooth walled barrel 71 contains the charging wand 70, that extends the length thereof, but is preferably insulated, by insulative sleeve 70*c*, along its length to a forward end section, which sleeve 70*c* may be a non-conductive coating, such as a plastic or ceramic material, with the charging wand rear end 70*a* connected into coupling 68. The smooth walled barrel 71 can be formed of a P.V.C. type plastic, silicon rubber, ceramic, or like material that is not electrically conductive.

The charging wand 70 is to provide a high voltage corona discharge therearound that will impart a like strong electrostatic charge onto each of the sorbent particles that pass through the barrel 71. Accordingly, for the invention to accommodate, and fully charge all the sorbent particles entrained in the flow of sorbent materials through barrel 71, the voltage passed to the charging wand 70 is preferably variable. To provide for varying the voltage to charging wand 70, as shown in FIG. 1, controller 20 is connected to a high voltage power supply 19 to enable an operator, at the controller 20 to set a voltage for a particle sorbent flow, of up to 100,000 volts at a current of up to 0.05 milli-amps. The power requirements of the present invention, as set out below, are significantly reduced over earlier systems due to a corona enhancement arrangement of the invention that includes the grounding ring or collar 95 or opposing grounding plates 101, as set out below.

The controller 20, as shown in FIG. 1, is preferably a control panel where an operator, not shown, can set a required voltage as an output to the charging wand 70 to produce a corona effect therearound, that is enhanced by the grounding ring 95 or opposing grounding plates 101. A volume of sorbent particles flowing as a laminar flow through the gun 10 barrel 71, that receives an electrostatic charge on each sorbent particle as it passes between the charging wand and grounding collar or plates. Which charge can be negative or positive, within the scope of the invention. Also, the smooth walled barrel 71 is preferably arranged to be removable and replaceable to accommodate different sorbent flow rates. In practice, the invention has employed, in one model, a two (2) inch diameter barrel capable of conveying, as a laminar flow, from one hundred fifty (150) to three hundred (300) cubic feet per minute of combined air and dry powered sorbent material. Another model of gun 10 has utilized a three (3) inch diameter barrel that is capable of conveying, as a laminar flow, three hundred (300) to five hundred (500) cubic feet per minute of combined air and dry powered sorbent material. It should, however, be understood that other appropriate diameters of barrels 71 could be so employed within the scope of this disclosure.

Shown in FIG. 4 and discussed above, the barrel can be a metal, ceramic, P.V.C. type plastic, or the like. The sorbent inlet tube 53 is connected into barrel 71 at an angle less than ninety (90) degrees and is preferably approximately thirty (30) degrees, and is fitted into the side of barrel 71. In practice, the sorbent particles are transferred at a pressure of approximately 1 to 5 psi, providing a laminar flow of air and sorbent material that passes through sorbent inlet tube 53 that has an approximate diameter of 2 to 3 inches. The flow travels into and through the barrel 71 that contains the charging wand 70 maintained longitudinally therein. The high voltage supplied to charging wand 70 is controlled to maintain a uniform high voltage corona discharge therearound. While the discharge may be formed along the entire wand length where the insulative sleeve 70*c* is not in place, it is preferably generated at a location immediately opposite to the grounding ring or collar 95 so as to extend across the barrel towards the charging collar 95 to negatively or positively charge the surface of each sorbent particle that passes therethrough.

Figure 5:
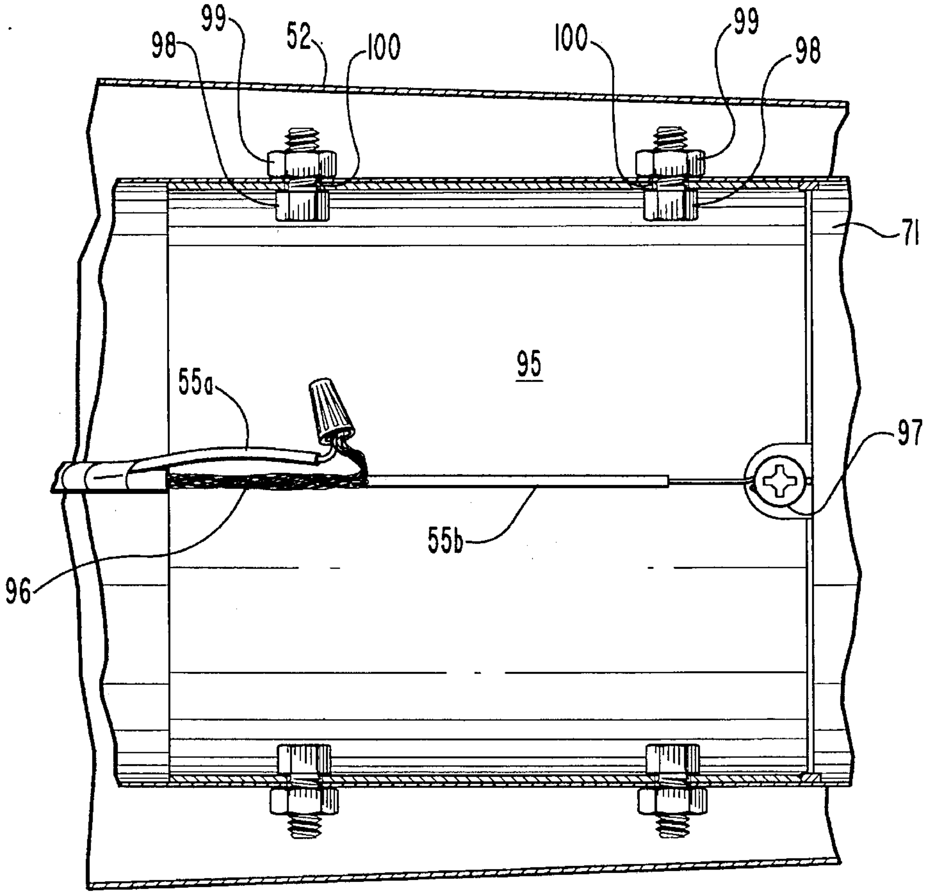
FIG. 5 is an enlarged sides elevation view of the grounding collar of FIG. 4.

As shown, the charging wand 70 is preferably insulated along its length to opposite to the grounding ring 95, and, to also provide for improvements in corona discharge generation and avoid arching, the opposing charging wand 70 and grounding ring 95 surfaces are preferably roughened. For efficient corona discharge generation, it has been found in practice that a ratio of the grounding ring 95 diameter to that of the charging wand 70 should be greater than approximately 2.7 and is preferably approximately 3.7. Additionally, as shown in FIG. 7A, the diameter of the section or portion of the charging wand 70 that is opposite to the grounding ring 95 may be increased to form a ridge 70*d* extending or projecting outwardly from the charging wand 70 surface and formed therearound to provide a desired ratio of grounding collar and charging wand diameters. Also, while the controller 20 is shown in FIGS. 1, 4 and 5 connected to the grounding ring 95, it should be understood that power can be supplied to which grounding ring from a battery source that is connected thereto, providing a wireless arrangement. Which controller or battery voltage is preferably adjustable.

The charged sorbent particles are then discharged into the tube 11 that contains the flue gas flow or stream, arrow A. Therein, the sorbent particles, that all bear the same negative or positive charge, tend to repel one another so as to be rapidly dispersed throughout that flue gas stream. A utilization, as is preferred in a practice of the invention, of very fine-grained sorbent particles tends to significantly increase the sorbent particles total surface area and considerably reduces the residence time required for their complete dispersion into the polluted gas stream. The charged particles themselves tend to attract both submicron and larger particulates in the flue gas stream, agglomerating with them to form larger particles of a size to be conveniently removed, cleaning the flow. Additionally, the charged sorbent particles also provide for chemically reacting with pollutants in the stream and forming a large area for charging particulates that are not already agglomerated. The flue gas stream with entrained sorbent is then directed into a collection system 13, as discussed hereinabove.

Dependant upon the characteristics of the flue gas stream pollutants and their volume in the gas stream, arrow A, a single electrostatic gun 10 may be sufficient to provide a required flow of electrostatically charged sorbent particles into that gas stream so as to fully charge of all the particulates in that flow, including submicron size particulates. Where such single electrostatic gun 10 is not sufficient to supply a required sorbent output. Even taking into account a capability for increasing or decreasing system capacity, a selection of an appropriate size of barrel 71 and controlling of the voltage transmitted to the charging wand 70 more than one gun 10 may be required. Accordingly, the invention can include, within the scope of this disclosure, a second, third of more guns 10, each functioning as described above. Which such second and additional guns 10 are preferably identical to the described gun 10.

Figure 8:
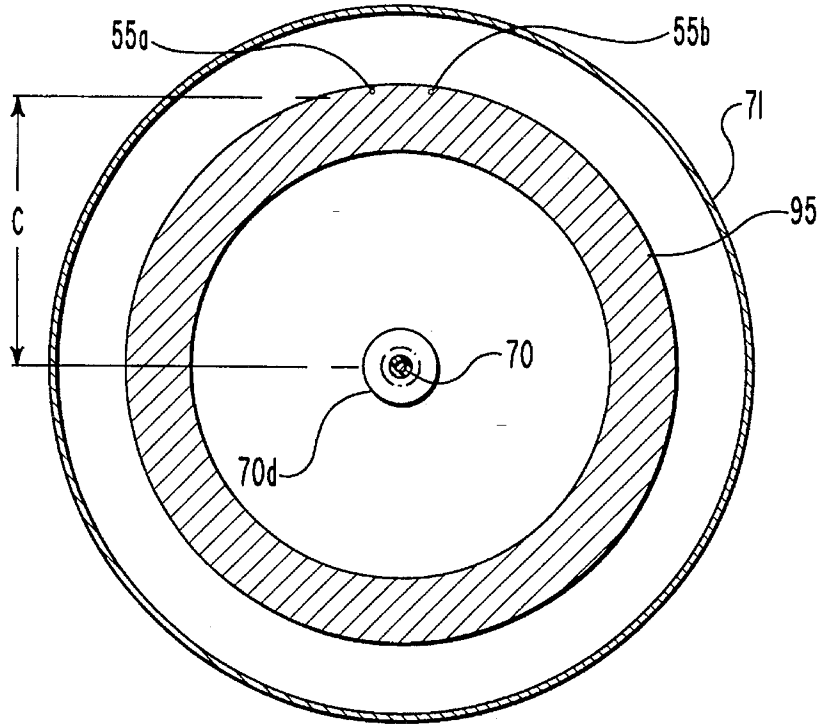
FIG. 8 is an enlarged cross sectional view taken within line 8—8 of FIG. 4 showing the grounding ring maintained in the electrostatic gun barrel with the charging wand centered therein.

The described grounding ring 95 located within the barrel 71, as a corona enhancement arrangement, is shown in FIGS. 1, 5 and 8. The grounding ring 95 is preferably formed of an electrically conductive material and is insulated from the barrel 71. The charge received at which grounding ring 95, it should be understood, is less than that transmitted to the charging wand 70 and can be either positive or negative so long as it is an opposite charge to that of the charge of the voltage that is transmitted to the charging wand 70. Accordingly, the high voltage present in the charging wand 70 will tend to be attracted to the grounding ring 95. This attraction tends to enhance the creation of a corona effect at a lesser power requirement than for guns without grounding rings. Which corona effect will extend from the charging wand outwardly towards the inner surface of the grounding ring and will be such that essentially all the sorbent particles that travel through the barrel 71 will pass through the corona discharge, fully charging the sorbent particle surfaces in that passage.

FIG. 5 shows the wires 55*a* and 55*b* as contained in a single cable and connect, respectively, to a grounded sheath 96, that is contained in which cable and to a connector 97, that is maintained to the grounding ring 95. For maintaining the ring or collar 95 within the barrel 71 bolts 98 with nuts 99 turned thereover are provided, that receive insulative washers 100 fitted therebetween for isolating the grounding ring 95 from the barrel 71, as set out above.

FIG. 8 shows a cross section of the grounding ring 95 with the charging wand 70 end section shown positioned in the center thereof.

Figure 9:
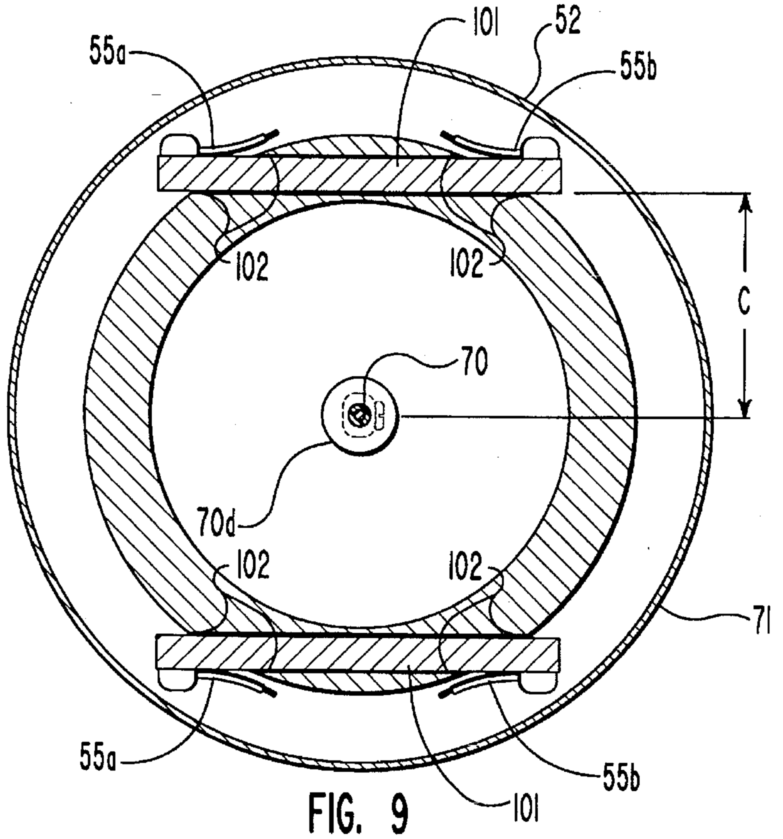
FIG. 9 is a view like that of FIG. 8 only showing a pair of spaced parallel grounding plates maintained in the electrostatic gun barrel, replacing the grounding ring, and showing the charging wand centered between the charging plates.

FIG. 9 illustrates another embodiment of grounding plates 101 as an additional arrangement for providing electrically attractive surfaces to promote formation of a corona discharge around charging wand 70. Which grounding plates 101 function like the grounding ring 95, as described above. The grounding plates are like parallel plates 101 that are mounted in the barrel 71 with the charging wand 70 centered therebetween. Preferably, each plate is maintained at the same distance identified as C from the charging wand. Which distance C is computed by an analysis of surface area relationships set out above for the grounding ring and charging wand radiuses. The opposing parallel plates 101 are each connected to wires **55*a* and 55*b* to pass a voltage thereto from the controller 20, or can be connected to a battery source. The grounding plates function like the grounding ring 95 for promoting the formation of a corona discharge around charging wand 70, except that the area across the opposing plate ends is open and so the corona discharge, as it extends towards which plates, includes lesser charged areas in the areas of the plate 101 ends. The plates 101, however, may be curved to close the distances between their ends, not shown, to overcome this deficiency and are preferably electrically insulated from the barrel 71 as by an inclusion of non-conductive spacers 102 positioned therebetween, or the like. Or, where the barrel itself is formed from a non-conductive material, spacers 102 may not be needed. Except as set out above, the opposing parallel plates 101 essentially function like the grounding ring 95**.

While embodiments of grounding surfaces identified as grounding ring 95 and opposing grounding plates 101, are set out and described above, it should be understood that other arrangements for providing electrically attractive surfaces within the barrel 71, for promoting the formation of a corona around charging wand 70, are possible within the scope of this disclosure.

Figure 7:
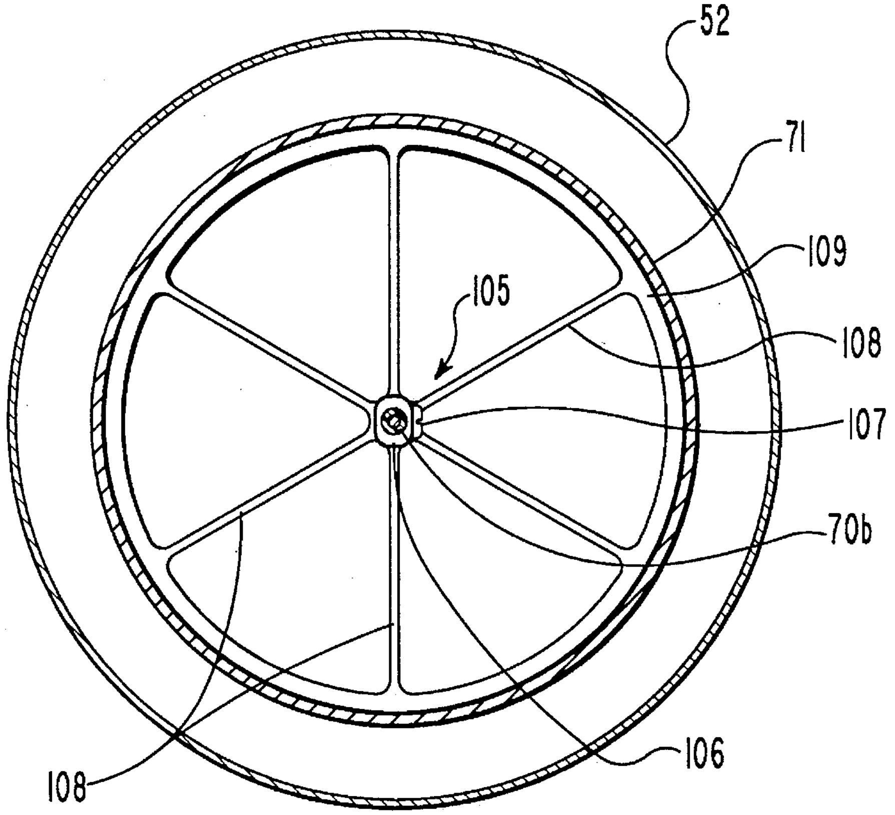
FIG. 7 is a view taken along the line 7—7 of FIG. 4, showing a spider mount arranged across the electrostatic gun straight barrel with a forward end of the charging wand fitted thereto.

The invention also preferably includes an arrangement for maintaining the charging wand 70 centered in the barrel 71, at the desired distance from the grounding surface or surfaces arranged therein. The charging wand 70 is, as set out above, maintained at its rear end **70*a* by the coupling 68. To provide for maintaining the charging rod forward end 70*b* stationary in barrel 71, the charging wand end 70*b* is preferably fitted into a center cup or cylinder 106 of a spider 105, as shown in FIG. 7. The spider 105 is shown as flat, and is arranged to be fitted across the barrel. The charging wand end is shown maintained in the spider cup or cylinder 106 by turning a set screw 107 thereagainst, that is threaded and turned through a threaded hole formed through the cup or cylinder wall, into engagement with the side of the charging wand end 70*b*, securing it therein. From the cup or cylinder 106 a number of straight radial members 108 extend outwardly at spaced intervals from around the center cup or cylinder 106. The radial members 108 connect into a ring 109 that is fitted into and is secured across the barrel 71 interior, perpendicular to the barrel 71 inner wall. As the charging wand 70 must be electrically isolated from the barrel 71, the spider 105 is preferably formed from a non-conductive material. Also, as a high volume flow of sorbent particles is to be directed through the open areas between the spider radial members, it is preferred that the spider 105** be formed of a strong durable material, such as a ceramic.

Figure 6:
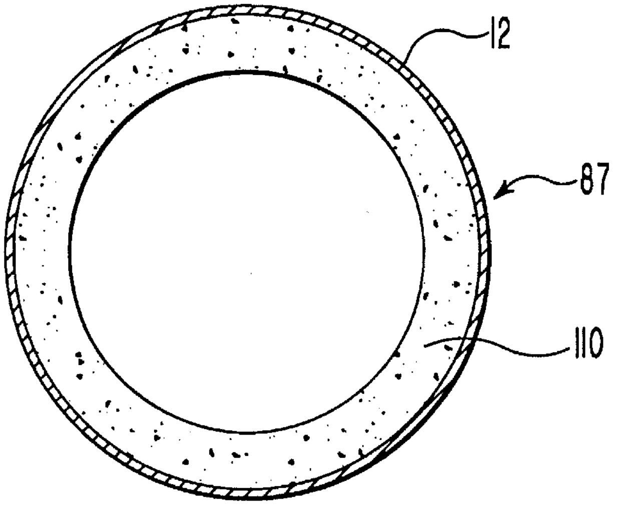
FIG. 6 is a cross sectional view taken along the line 6—6 of FIG. 4, showing a cross section of a discharge barrel end of the electrostatic gun.

As set out above, a laminar flow of charged sorbent particles, under pressure, passes through the spider 105 and, for the arrangement shown in FIG. 4, is directed through the barrel angled end 82 to flow into a bell end of the sorbent feed nozzle 87 that narrows into the sorbent discharge tube 12. In which narrowing, the velocity of the sorbent particle flow increases, thereby increasing the corrosive effects of the particles on a surface whereover they pass. Accordingly, it is preferred to line the sorbent discharge tube 12, as shown in FIG. 6, with a layer of a hard material 110, such as a ceramic. Which ceramic material will resist damage from contact with the sorbent particles, and will act as an electrical insulator to maintain the charged state of any sorbent particles coming in contact therewith.

As set out above, after passage through the sorbent discharge tube 12, the charged sorbent particles, under pressure, travel into and are thoroughly mixed into the gas stream, arrow A. The agglomerized and charged sorbent and pollution particles travel through tube 11 and into an apparatus 13 for removal.

While a preferred embodiment of our invention in an improved electrostatic gun for electrostatically charging and injecting sorbent particles into a flue gas steam has been shown and described herein, it should be understood that the present disclosure is made by way of example only and that variations and changes thereto are possible without departing from the subject matter coming within the scope of the following claims, and a reasonable equivalency thereof, which claims we regard as our invention.

We claim:

1. An electrostatic gun for use in a remediation process for the removing pollutants from a flue gas stream that provides for charging the individual particles of a flow of sorbent materials and injecting then into a flue gas stream to charge to agglomerize with pollution particles therein for later removal comprising: a gun having a housing that includes a straight open barrel; means for connecting said housing to a hopper system means for passing a flow of sorbent materials under pressure through said straight barrel; a discharge means formed across an open forward end of said straight barrel to pass a flow of sorbent materials therethrough and into a tube wherethrough a flue gas flow is directed, which said tube connects to a pollution removal apparatus means; a straight charging wand formed from an electrically conductive material that is centered axially in said straight barrel; a high voltage source connected to said charging wand and means for controlling a voltage from said high voltage source flowing therefrom into said charging wand; corona enhancement means that is connected to an electrical power source to provide an opposite electrical charge from the charge on said charging wand and is mounted in said straight barrel to be spaced apart from said charging wand; and means for providing said electrical charge to said corona enhancement means.

2. An electrostatic gun as recited in claim 1, wherein the gun housing is cylindrical; and a rear end of the charging wand is connected to the high voltage source of electrical power through an insulator means that is maintained in said gun housing.

3. An electrostatic gun as recited in claim 2, wherein the insulator means is a conventional ceramic insulator that contains a conducting rod maintained axially therein and connects to the power supply on a rear end and to the charging wand on a forward end.

4. An electrostatic gun as recited in claim 1, wherein the discharge means is a tube that is open into the tube wherein the flue gas flows and is lined with an electrically non-conductive material.

5. An electrostatic gun as recited in claim 1, wherein the charging wand is contained within an insulative sleeve to a forward end section that is opposite to the corona enhancement means discharge means is bent from the center axis of the straight barrel.

6. An electrostatic gun as recited in claim 5, wherein the insulative sleeve wherein the charging wand is position is an electrically non-conductive coating applied to said charging wand up to the forward end section that is opposite the corona enhancement means.

7. An electrostatic gun as recited in claim 1, wherein the corona enhancement means is a grounding ring formed from a flat section of an electrically conductive material that is formed into a circle, is mounted in the straight barrel and is connected to receive the electrical charge and the ratio of the grounding ring and charging wand diameters is greater than 2.7.

8. An electrostatic gun as recited in claim 7, wherein an inner surface of the grounding ring is spaced at an equal distance apart from a charging wand surface.

9. An electrostatic gun as recited in claim 8, wherein the ratio of the diameters of the grounding ring and charging wand is approximately 3.7.

10. An electrostatic gun as recited in claim 1, wherein the corona enhancements means is a pair of grounding plates that are formed of identical flat sections of electrically conductive material and are arranged parallel to and across from one another in the straight barrel and spaced the same distance apart from the charging wand, and said grounding plates are connected to receive the same electrical charge from the electrical power source.

11. An electrostatic gun as recited in claim 10, wherein the opposing grounding plate surface are spaced a distance apart from the charging wand surface where the ratio of the distance between the grounding plates and charging wand diameter is greater than 2.7.

12. An electrostatic gun as recited in claim 11, wherein the ratio of the grounding plates spacing distance and charging wand diameter is approximately 3.7.

13. An electrostatic gun as recited in claim 1, further including means for maintaining the charging wand axially centered in the straight barrel.

14. An electrostatic gun as recited in claim 13, wherein the means for maintaining the charging wand axially centered in the straight barrel is a spider that is formed from an electrically non-conductive material and includes a center means for receiving a forward end of said charging wand, and includes a plurality of straight radial members extending from spaced points around said center means outer surface that connect to spaced points along an inner surface of a collar means that is fitted into the straight barrel.

15. Apparatus as recited in claim 14, wherein the spider is formed from a ceramic material.

16. An electrostatic gun as recited in claim 1, wherein the opposing surfaces of the corona enhancement means and charging wand are roughened.

17. An electrostatic gun as recited in claim 1, wherein the charging wand forward end surface that is opposite to the corona enhancement means is flared outwardly into a ridge.

* * * * *